June 12, 1928.  
L. SÉMAT  
1,673,209

SYSTEM OF PICTURE TRANSMISSION

Filed Nov. 14, 1924  6 Sheets-Sheet 1

L. SÉMAT 1,673,209

SYSTEM OF PICTURE TRANSMISSION

Filed Nov. 14, 1924    6 Sheets-Sheet 2

Fig.2

Inventor
L. Sémat
By Markes Clerk
Attys.

L. SÉMAT 1,673,209

SYSTEM OF PICTURE TRANSMISSION

Filed Nov. 14, 1924  6 Sheets-Sheet 6

Inventor
L. Sémat

Patented June 12, 1928.

1,673,209

UNITED STATES PATENT OFFICE.

LAURENT SÉMAT, OF PARIS, FRANCE.

SYSTEM OF PICTURE TRANSMISSION.

Application filed November 14, 1924, Serial No. 749,967, and in France July 25, 1924.

From the works of the applicant, systems are already known permitting to transmit at a distance graphic reproductions. These apparatus were essentially constituted by rotary cylinders one of which received the proof to be transmitted whilst the other was covered with the surface on which the reproduction was to be effected. At each station, the motor which was continuously rotating during the transmission permitted to actuate or not, by means of a friction coupling, the corresponding cylinder. For actuating the cylinders and obtaining their iso-synchronism, one of them was stopped at each of its revolutions and remained immobilized until the other cylinder had effected also a complete revolution. At this moment, the second cylinder acted electromagnetically for causing the disengagement of the first one to cease, which first cylinder re-started for effecting a new revolution. During the rotation, an emitting stylus was exploring the proof to be transmitted, this determined, in the line, a series of current impulses. These impulses produced, at the receiving station, the energization of electromagnets surrounding the reproducing stylus and the pressures of the latter relatively to the surface of impression, the cylinder carrying a soft iron lining for constituting the armature of the said electromagnets.

The line which connected the two stations was therefore traversed on the one hand by an emission of current which permitted the starting of one of the cylinders when the other was terminating its rotation, on the other hand, by emissions of currents adapted to determine the reproduction of the parts of the proof transmitted. These currents, which circulated in the same direction, had to be different, since they had to act on different members and produce actions also different. Use was made, for that purpose, of currents the differences of potential of which were not the same. This necessitated delicate adjustments and, moreover, did not permit an easy adaptation of these apparatus on the lines used for the transmissions in conventional signs, such as the transmissions in the Morse code for instance.

The present invention has for object a system called "Semagraph" which has been devised for remedying the above mentioned incoveniences; this system is more particularly characterized in that the emissions of current which control the movements of rotation of the cylinders and the emissions of current for the reproduction of the proof to be transmitted, are produced by different sources of current, arranged at each station. Their differences of potential can then be equal, so that the said sources can be used for the transmission, in Morse code for instance; the plant for the graphic reproduction being, moreover, devised for permitting its easy connection with the existing Morse plants and allowing to pass instantaneously, without any modification in the connections established, from the transmission of writing, drawings, etc. . . . to the transmission of conventional signs in dot and dashes of the Morse alphabet.

It will be assumed, in the following description, that the emitting and receiving apparatus are identical and can be indifferently used for the emission or the reception.

In this case, the similar cylinders 1, 2, can receive, according to the functions of the station, soft iron linings 3, 4, of different thicknesses; one, 3, carrying the proof to be transmitted and the other 4, being provided with the surface on which the images are registered or recorded. On the conducting linings 3, 4, can press a conducting brush 5, 6, and the axes of the cylinders carry two abutments 7, 7', 8, 8' the angle of which is invariable.

Parallel to the axes of the cylinders 1, 2, are arranged the driving screws 9, 10, of the emitting or reproducing styles. For that purpose, the screws are combined with a nut 11, 12, which can be engaged or disengaged at will. Each nut 11, 12, supports a carriage 13, 14, provided with a small vertical column or standard. About the latter can be angularly displaced a double arm 17, 18, which carries at its ends the rocking supports of the exploring style of the emitter and of the electromagnets actuating the reproducing style of the receiver. The circuits of the exploring style 19, 20, and of the electromagnets 21, 22 of the reproducer lead to brushes rubbing on insulated collector rings carried by the small column 15, 16. It will therefore be seen that it is possible, by angular displacement of the double arm 17, 18, about the said column 15, 16, to put in action, with the corresponding cylinder, either the exploring style or the reproducing style.

The fixing in position is identical at both stations. It will be noted that the even digits designate, at one of the stations, parts corresponding to those designated at the other station by the odd digits preceding them. Each plant comprises a local source 23, 24 a terminal of which is, for instance, grounded and, on the other hand, is connected to the contact piece 25, 26 of a three way switch 27, 28. The other terminal is connected to a switch 29, 30, which permits of opening or closing the general circuit, through the conductor 31, 32, leading to the contact piece 33, 34 of the switch 27, 28. The latter controls:

1. The contact piece 35, 36, corresponding to the contact piece 33, 34 for closing the circuit on a five-way switch 37, 38, and the contact-piece 39, 40 leading to the contact 41, 42, of a Morse sender 43, 44.

2. The contact piece 45, 46 corresponding to the contact piece 25, 26 which is connected to the electromagnet 47, 48 of the Morse receiver and to the closing contact 49, 50 of the receiving circuit of the said apparatus.

3. The contact-pieces 51, 52 and 53, 54, one of which 51, 52 is connected to the transmission line L and the other 53, 54 to the five-way switch 37, 38.

By following the contact pieces of the five-way switch 37, 38 in a clockwise direction, it is seen that:

(*a*) The contact-piece 55, 56 is connected, as already indicated, to the contact piece 35, 36 of the three-way switch 27, 28.

(*b*) The contact piece 57, 58 is connected to a key 59, 60 which can occupy three positions.

In a position, it closes the circuit 61, 62 through a sender 63, 64, on a bell 65, 66. The intermediate position 67, 68 is a separating position. In the other position, 69, 70, it closes a circuit leading to the contact 71, 72.

This key 59, 60, carries a finger 73, 74 which can act on an auxiliary switch 75, 76. The circuit of this switch leads, on the one hand, to the contact 77, 78, on the other hand, to a two-way switch 79, 80 permitting to insert in the circuit either the lamp 81—82; or the emitting styles 19, 20 and reproducing styles (electromagnets 21, 22) through the conductor 83, 84.

(*c*) The contact piece 85, 86, is connected to the common point 87, 88.

(*d*) The contact piece 89, 90, is connected to the circuit of the reproducing style (electromagnet 22) and to the lamp 81, 82.

(*e*) The contact piece 91, 92 is connected to the brush 5, 6, which can rub on the conducting lining 3, 4 of the cylinder 1, 2.

(*f*) The contact piece 93, 94, is grounded.

(*g*) The contact piece 95, 96 is connected to the electromagnet 97, 98 and to the movable contact 99, 100.

On this circuit is branched that of the bell 65, 66.

(*h*) The contact piece 101, 102 is connected to the contact piece 53, 54 of the three-way switch 27, 28 for Morse signals or images.

(*i*) The contact piece 103, 104 is connected to the circuit of the key 59, 60 and to the circuit connecting the contact pieces 57, 58 to the key 59, 60.

(*j*) The contact piece 105, 106 is connected to the common point 87, 88.

(*k*) The contact piece 107, 108 leads to the contact 109, 110.

The insulated contacts 71, 109 and 72, 110 which can alternately come in engagement with the contacts 99, 77 and 100, 78 are carried by a rocking lever 111, 112. The latter is provided with an abutment 113, 114, which combines with the abutment 7', 8' secured on the axis of the cylinder 1, 2.

The handle 115, 116 allows to stop the abutment 7 or 8 and, consequently, to determine the stoppage of the two cylinders 1, 2, either from a station or from the other.

The other rotating abutment 7, 8, can engage with a stop abutment 117, 118 electromagnetically actuated by the electromagnet 97, 98.

It will be indicated that:

1. The three-way switch 27, 28 permits to put in circuit either the emitting and receiving apparatus, for the transmission of writing, drawings, etc. . . . or the emitting and receiving apparatus of the Morse plant.

2. The five-way switch 37, 38 allows to render the apparatus transmitting writing, drawings, etc. . . . either emitter or receiver. To this switch can be connected the operating handle of a rheostat, this permitting to automatically modify the speed of the electric motor actuating the corresponding cylinder.

It is obvious that instead of using the current of the sources 23, 24, for directly energizing the electromagnets 97, 98, the said electromagnets could be used as relays.

These electromagnets would then control the circuit of local sources on which would be connected the electromagnets which must produce the attraction of the levers 117, 118.

Figure 1:
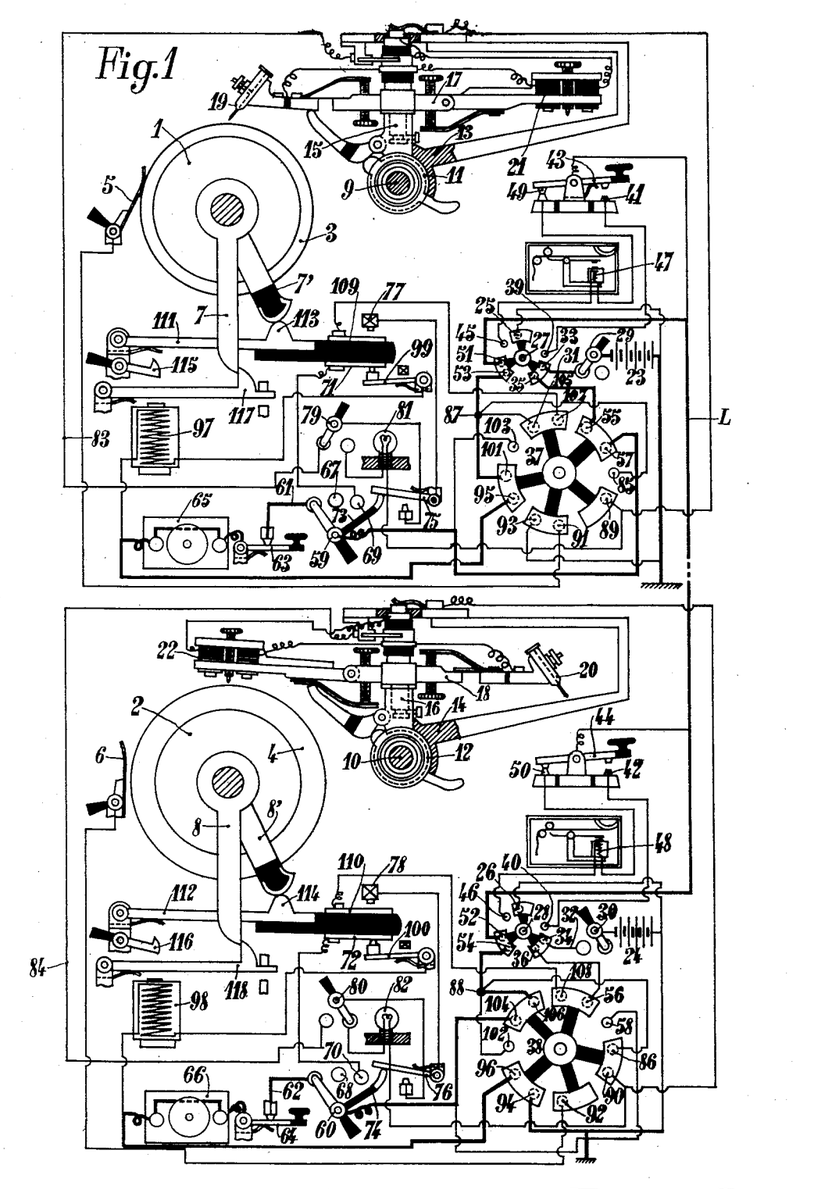
Figs. 1, 2, 3, 4, show, in various phases of operation, the plant forming the subject-matter of the present invention, in the course of the transmission of a graphic reproduction; the apparatus, at each station, can be either a transmitting apparatus or a receiving apparatus.

The operation is as follows:

In waiting position, the keys 59, 60 occupy the positions of Fig. 1, that is to say they close the circuit of the ringing bell 65, 66. The switches 37, 38 occupy the receiving position, that is to say the position shown at the lower part of Fig. 1. At the emitting station, the metallic lining 3 carrying the message to be transmitted (which can be an image traced with insulating ink on a conducting sheet) is placed on the cylinder 1 the motor of which is started. The cylinder 1 remains stationary. The brush 5 is applied against the lining 3. The emitting style 19 is placed in position. The switch 27 occupies the out of circuit position of the Morse apparatus. The switch 37 is placed in position of emission (Fig. 1).

The switch 29 is then closed. The current circulates in the circuit indicated by the thick line, this puts in action the bells 65, 66, at both stations.

At the called station, the key 64 is acted upon; interruptions are thus produced in the bell circuit, this warning the sending station of the reception of the call. A similar operation, at the sending station, can constitute a reply to the preceding signal.

At the called station, on the cylinder 2 is placed the lining 4 provided, for instance, with a sheet of carbon paper in contact with a sheet of thin transparent paper (the latter is preferably placed on the top). The motor is started. The keys 59, 60 are then, at both stations, respectively carried by the contact pieces 69, 70, this opening the calling circuit.

The switches 75, 76 close the circuit on the switches 79, 80, this closing the circuit on the lamp 82 of the receiver. The current produces the lighting of this lamp when the emitting style 19 has been put in contact with the cylinder 1 and when the engagement of the carriage 3 with the worm 9 has been effected.

At this moment, the switch 80 is actuated at the receiving station, this opening the lamp circuit and closing that of the recording style (electromagnets 22) which had been previously put in position on the cylinder 2, its carriage 12 being engaged with the worm 10.

Figure 2:
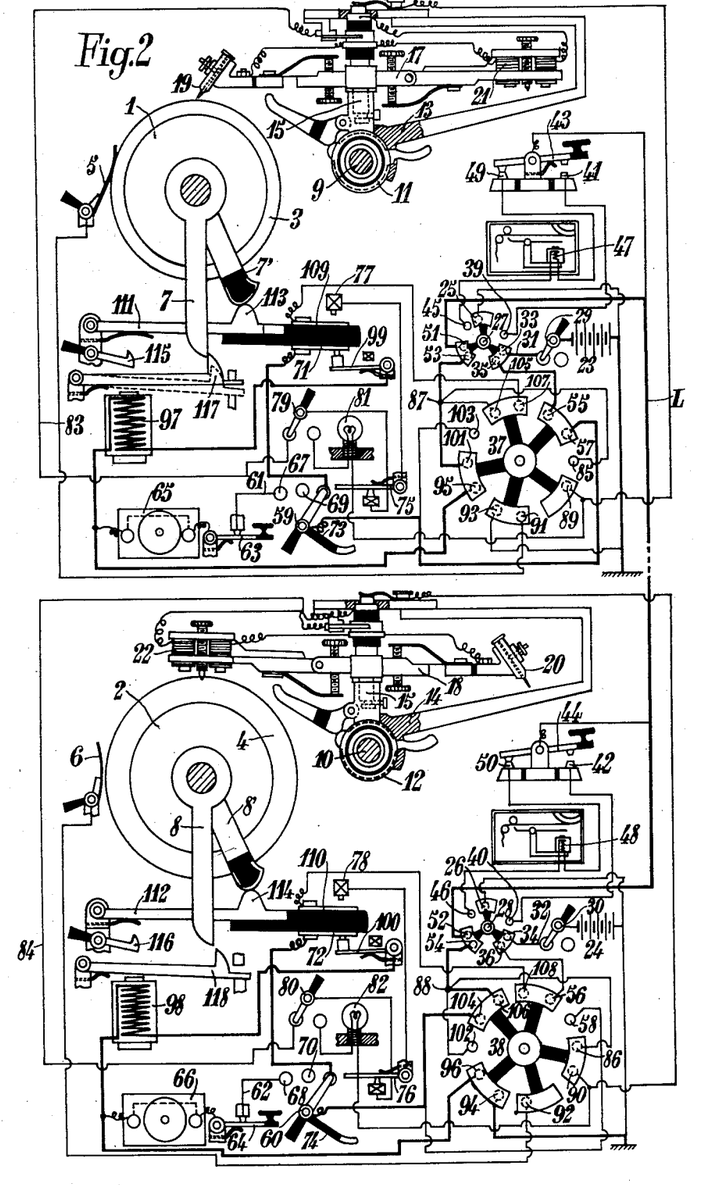

The transmission then begins (Fig. 2).

At the transmitting station, the actuation of the key 59 has closed the circuit indicated by the thick line, that is to say the electromagnet 97 has been energized and has drawn the abutment 117 cooperating with the abutment 7 of the cylinder 1. The latter is therefore caused to rotate, whilst at the receiving station, the current coming from the source 23 of the emitting station energizes the electromagnet 98. The latter attracts the abutment 118 which releases the abutment 8 and permits the starting of the cylinder 2.

The emitting style 19 in contact with the message to be transmitted will therefore permit the passage in the line L of a series of impulses.

For that purpose, as soon as the cylinders 1 and 2 have been started, the abutments 7' and 8' have ceased to be in contact with the abutments 113, 114 of the rocking levers 111, 112. The latter resiliently brought back, open the energization circuit of the electromagnets 97, 98 (the contacts 71, 72 move away from the contacts 99 and 100). The engaging abutments 117, 118 take back their waiting positions.

Figure 3:
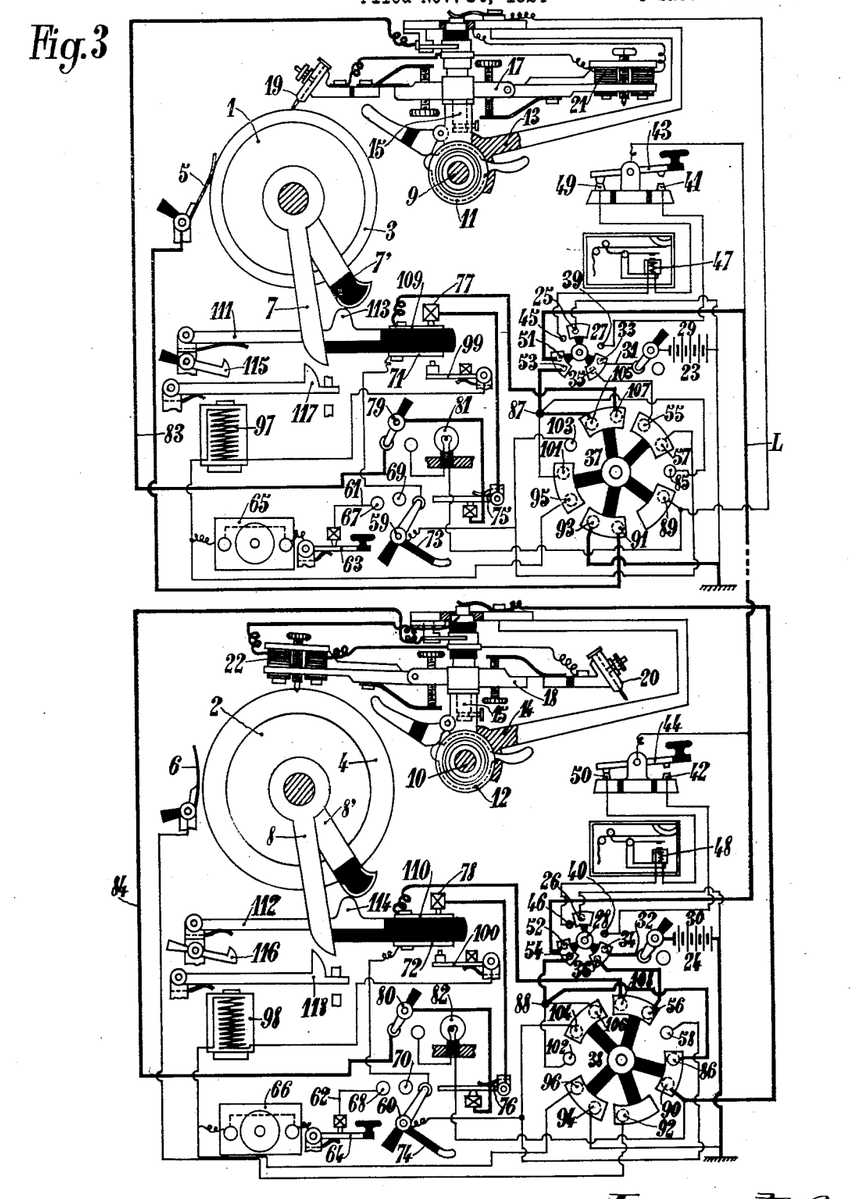

In Fig. 3, the contacts 109, 110 come in engagement with the contacts 77, 78, this closing the following circuit: source 24 of the receiving station, reproducing style, switch 80, conductor 84, electromagnets 22 of the reproducing style, covered contact pieces 90, 86, through 88, covered contact pieces 54, 52 to the transmission line L, then to the sending station through the covered contact pieces 51, 53, to the contacts 77, 109, switch 79 and through the conductor 83 to the style 19, then through the support of the image, brush 5 and covered contact pieces 91, 93 to the ground. At each energization of the electromagnets 22, the latter are drawn by the iron lining 4 of the cylinder 2, this determining on the receiving style (provided with a blunt point, of diamond, for instance) pressures which determine the transfer of the ink of the carbon paper on the thin bank post.

It will therefore be seen that the current which controls the synchronism of the cylinders 1 and 2 is supplied by the source 23, whilst the current for the transmission of the message is supplied by the source 24. It is obvious that the reverse might take place and that the sources 23, 24 instead of being at the emitting and receiving stations might quite as well be arranged at the receiving and emitting stations.

Figure 4:
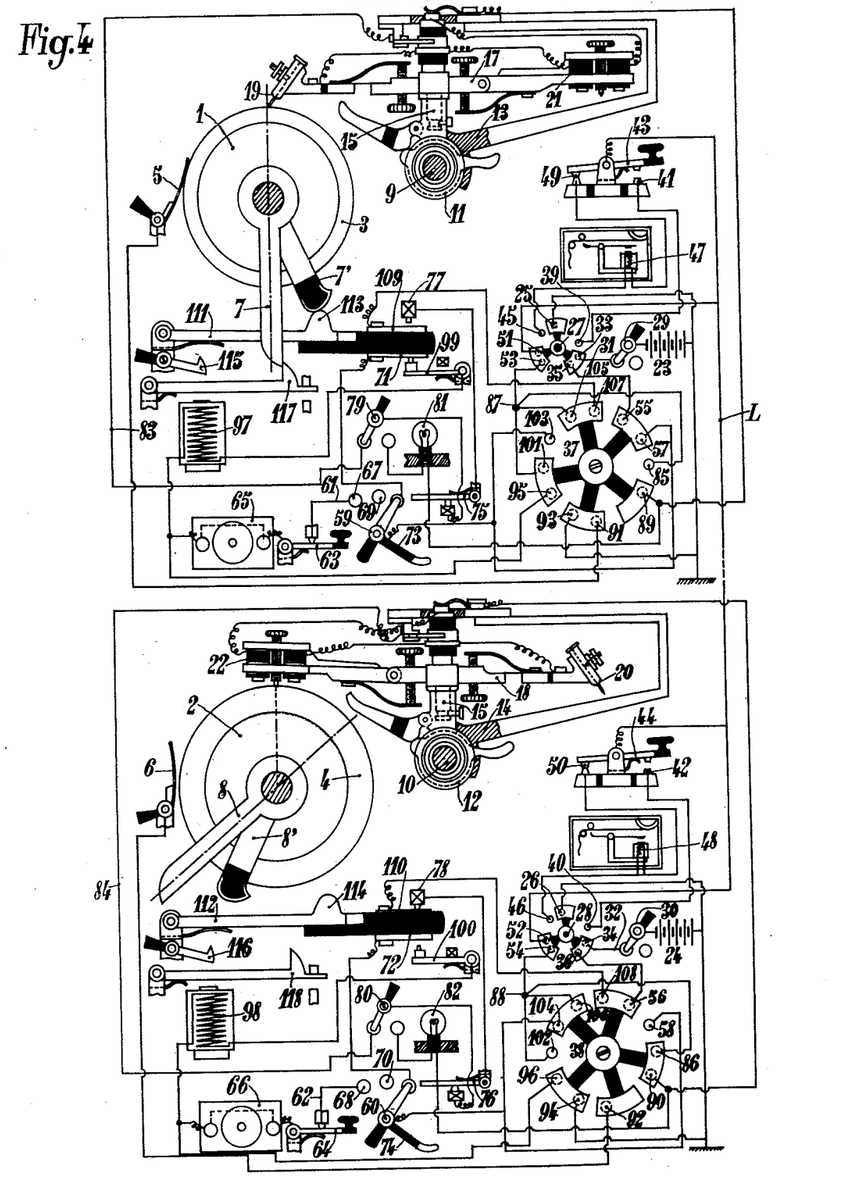

In Fig. 4, when the emitting cylinder 1 has effected a complete revolution, its abutment 7 engages with the abutment 117, this determining the disengagement of the cylinder; the motor and the driving wheels continue to rotate.

Simultaneously, the abutment 7' engages with the abutment 113, this lowering the rocking lever 111. The circuit is broken by the rupture between the contacts 109—77; the contacts 71, 99 are pressed against each other in waiting position (Fig. 4). No current passes any longer in the line L. As the receiving cylinder 2 has not finished its movement (Fig. 4) its rotation continues, the emitting cylinder 1 remaining fixed. At the end of the movement, the abutment 8' acts on the rocking lever 112 (abutment 114) this closing the contact between 72 and 100. We now come back to the case of Fig. 2, that is to say the electromagnet 97 energized by a current then coming from the source 23, unlocks the cylinder 1 (abutments 117—7) at the same time as the electromagnet 98 attracts its armature 118, this allowing the abutment 8 to pass without determining the stoppage of the receiving cylinder 4 and permits a new cycle in the two stations.

The receiving cylinder therefore rotates continuously, whilst the other is subjected to stoppages at each revolution for obtaining the isosynchronism. At the end of the transmission, the actuation of the switch 29 stops both apparatus.

If the switch 80 of the receiver is placed, for a transmission, in its other position, the electromagnets 22 of the recording style are put out of circuit and the lamp 82 is put in circuit, this permitting a photo-electric reception on a sensitive plate placed on the cylinder 2.

Figure 5:
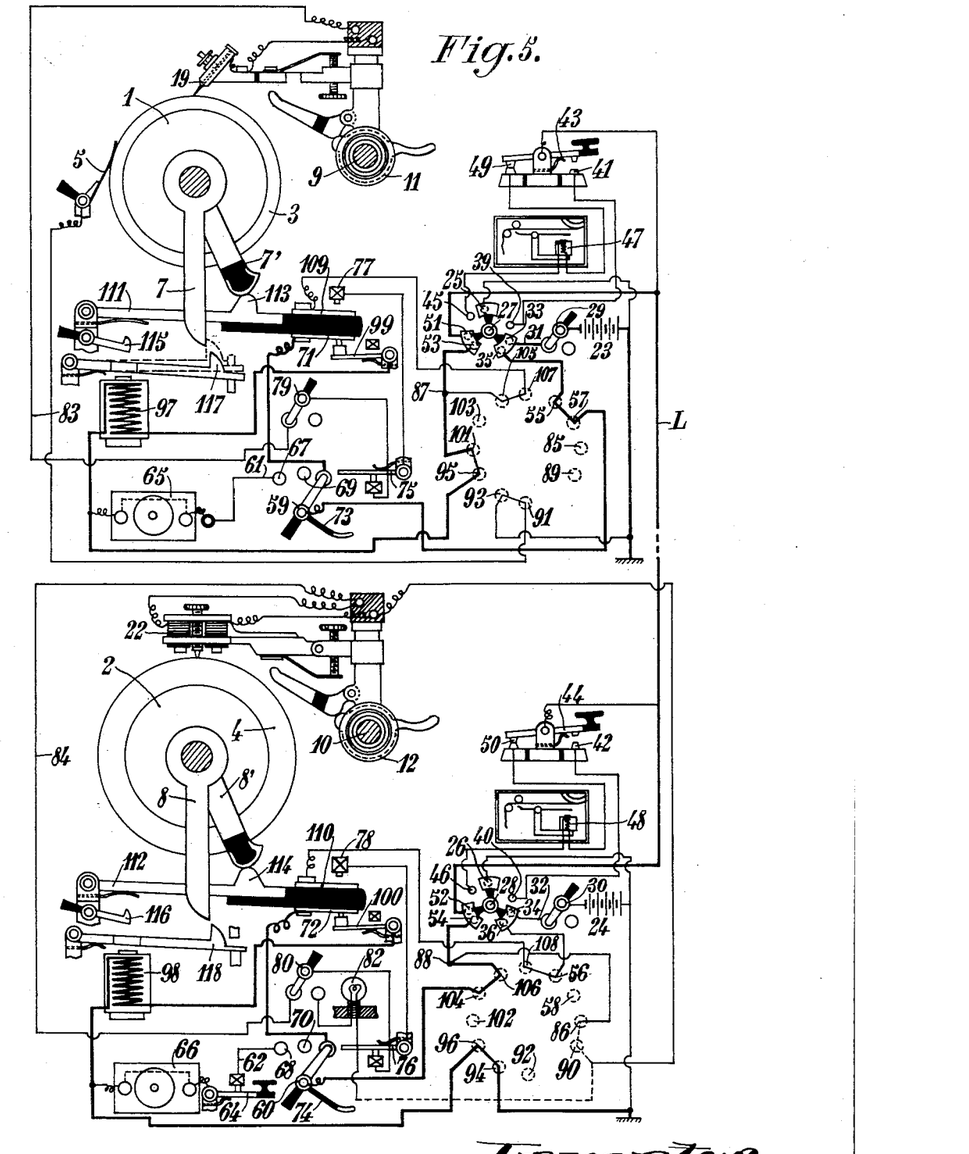
Fig. 5 shows a simplified form of the plant in case the apparatus are transmitting or receiving apparatus.

In Fig. 5 is shown the plant in case one of the stations is still an emitting station and the other a receiving station. It will be seen that it suffices, in this case, to substitute fixed connections for the movable conducting bridges of the five way switch 37.

The contact pieces without connections correspond to the circuits of reversal of the apparatus which, of course, are done away with.

The operation is similar to that which has been described.

Figure 6:
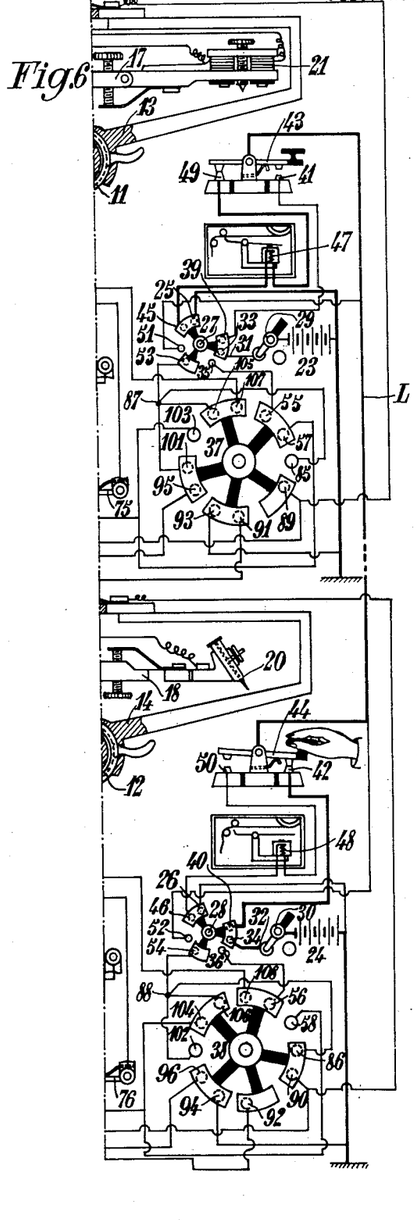
Figs. 6 and 7 are partial views showing the operation in the course of transmissions by means of Morse apparatus, which are combined with the apparatus permitting the transmission of graphic reproductions.
Figure 7:
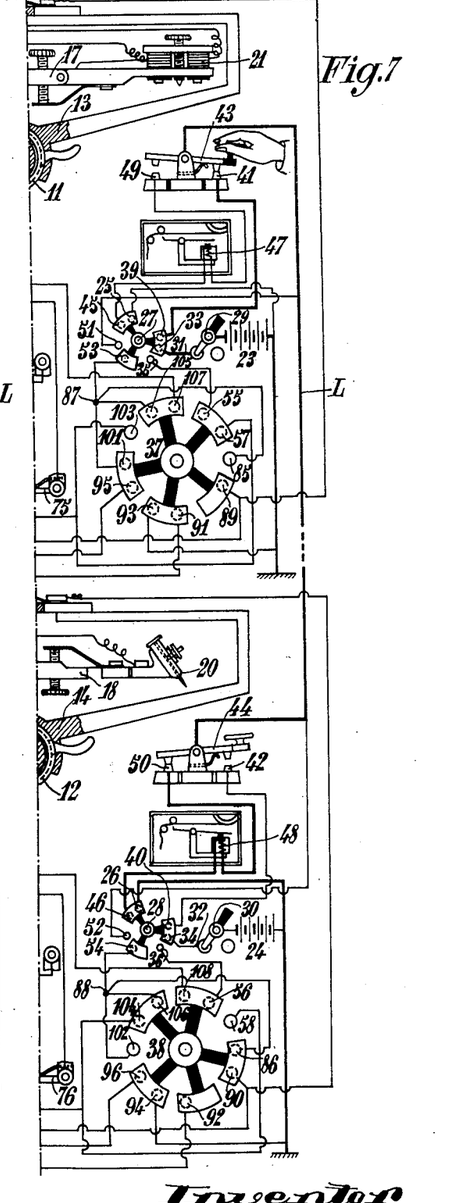

For using the single line L for the transmission and the reception, by means of Morse apparatus, it suffices to move similarly at the two stations the three-way switches 27, 28, as shown in Figs. 6, 7.

This operation determines the putting out of circuit of the emitting and receiving apparatus serving for the reproduction of writing, images, etc. In Fig. 6, the lower station is a transmitting station, the circuit is indicated by thick lines. On the contrary, in Fig. 7, the lower station is a receiving station. It will be seen that, as the case may be it is the local source of the emitting station or of the receiving station of the rotating apparatus which is used for supplying the transmission current to the Morse apparatus. The local sources which control the isosynchronism of the rotating apparatus as well as the transmission and reproduction of the message are therefore alternately used for the transmission in the Morse alphabet according as the station to which they belong is a transmitting or a receiving station, as this happens moreover in the existing Morse plants.

What I claim as my invention and desire to secure by Letters Patent is:

1. In a system for transmission of pictures at long distance, a transmitting station and a receiving station which are connected by one line and each comprising a battery, a support, a frame for receiving an exploring stylus and a reproducing stylus, means for displacing said support and the frame relatively to each other to permit one stylus to explore the surface of the support, means comprising the battery of the transmitting station for synchronizing movements of the support and the frame of each station, and means comprising the battery of the receiving station for transmitting the picture.

2. In a system for transmitting pictures at a distance, a transmitting station and a receiving station connected by one line, and each comprising a battery, a support, a frame for receiving an exploring stylus and a reproducing stylus, means for displacing said support and the frame relatively to each other to permit one stylus to explore the surface of the support, means comprising the battery of the transmitting station for synchronizing the movements of the support and to the frame at each station, means comprising the battery of the receiving station for transmitting the picture, and means for adapting each station to transmission or reception respectively.

3. In a system for the transmission of pictures at distance, a transmitting station and a receiving station which are connected by one line and each comprising a battery, a turning support, a frame receiving an exploring stylus and a reproducing stylus, said frame being displaceable in rectilinear translation, means for producing simultaneously the rotation of the support and the translation of the frame, means comprising the battery of the transmitting station for synchronizing the relative movements of the support and the rack at each station, means comprising the battery of the receiving station for transmitting the picture, and means for adapting each station either to the transmission or to the reception.

4. In a system for the transmission of pictures at distance, a transmitting station and a receiving station which are connected by one line, each comprising a battery, a cylindrical rotary support, a frame for receiving an exploring stylus and a reproducing stylus, said frame being displaceable in rectilinear translation, means for producing simultaneously the rotation of the support and the translation of the stylus for synchronizing the relative movements of the support and the frame of each station, said means comprising the battery of the transmitting station and a commutator controlled by the rotation of the cylindrical support, means comprising the battery of the receiving station for transmitting of the picture, and means for adapting each station either to the transmission or to the reception.

5. In a system for transmitting pictures at distance, a transmitting station and a receiving station connected by one line and each comprising a battery, a rotary cylindrical support, a frame receiving an exploring stylus and a reproducing stylus, said frame being rotatably mounted upon a carriage displaceable in rectilinear translation, means for producing simultaneously the rotation of the support and the translation of the frame, a stationary abutment on said rotary support, a bolt or pin connected with said abutment, a commutator controlled by the rotation of the cylindrical support, said commutator being disposed for controlling two circuits, of which one comprises the battery of the transmitting station and a controlling locking electro-magnet adapted for synchronizing the relative movement of the support and the frame at each station, the other of said circuits comprising the battery of the receiving station, the exploring stylus and the cylindrical support of the transmitting station, the reproducing stylus and the cylindrical support of the receiving station being adapted for transmission of the picture, and means for adapting each station either for transmission or reception.

6. In a system for transmission of pictures at distance, a transmitting station and a receiving station connected by a line and each comprising a battery, a rotary cylindrical support, a frame receiving an exploring stylus and a reproducing stylus, said frame being rotatable on a carriage displaceable in rectilinear translation, means for producing simultaneously the rotation of the rotary support and the translation of the frame, a stationary abutment on said support, a lock bolt in connection with said abutment, a commutator controlled by the rotation of the cylindrical support, said commutator being disposed for controlling two circuits of which one, comprising the battery of the transmitting station and an electromagnet for controlling the said bolt is adapted to synchronize movements of the support and the frame at each station, while the other of said circuits comprising the battery of the receiving station, the exploring stylus and the cylindrical support of the transmitting station, is to transmit the picture, and a commutator for adapting each station either for transmission or reception.

7. In a system for transmission of pictures at distance, a transmitting station and a receiving station connected by a line, each comprising a battery, a rotary cylindrical support, a frame receiving an exploring stylus and a reproducing stylus, the latter forming the core of an electro-magnet, said frame being rotatable on a carriage displaceable in rectilinear translation, means for producing simultaneously the rotation of the support and the translation of the carriage, a stationary abutment on said rotray support, a lock bolt in connection with said abutment, a commutator controlled by the rotation of the cylindrical support, said commutator being disposed for controlling two circuits of which one, comprising the battery of the transmitting station and an electro-magnet for controlling the said bolt, is adapted for synchronizing the relative movement of the support and the frame at each station, while the other circuit, comprising the battery of the receiving station, the exploring stylus and the cylindrical support of the transmitting station, the electromagnet of the reproducing stylus and the cylindrical support of the receiving station, is adapted to insure the transmission of the picture, and a commutator for adapting each station either for transmission or reception.

In testimony whereof I have signed my name to this specification.

LAURENT SÉMAT.